TITANATE RECTIFIERS

Filed March 11, 1953

INVENTOR
JOSEPH J. DYMON
BY
F. Kumpf
ATTORNEY 2,820,184
Patented Jan. 14, 1958

2,820,184

TITANATE RECTIFIERS

Joseph J. Dymon, Flushing, N. Y., assignor to Sylvania Electric Products Inc., a corporation of Massachusetts Application March 11, 1953, Serial No. 341,726

19 Claims. (Cl. 317—236)

This invention deals with crystal rectifiers of the point contact or area contact type. More particularly, it is a description of a group of novel compositions consisting primarily of alkaline earth titanates or mixtures thereof in a reduced state which are effective as crystal rectifiers.

A crystal rectifier is a non-linear device which has the property of transforming alternating current into direct current and is capable of handling fairly broad frequencies of alternation of the source current. Such crystal rectifiers depend for their action for the most part on the presence of regional areas generally at the surface to which current is conducted more readily in one direction than in the other direction. Such regions or areas have been designated as barrier layers. These barrier layers are extremely thin and their effectiveness may be designated by the fact that normally the resistances in non-conducting direction may be several thousand times higher than the resistance in the conducting direction.

Two fairly standard means have been developed for using such rectifiers. The first involves application of extremely fine point. A major function of the use of such point contact is miniaturization and reduction of electrostatic capacity. Under these conditions the crystal rectifier is suitable for high frequency purposes and is used as a detector in the micro-wave region as a substitute for a vacuum tube. As a matter of fact point contact crystal rectifiers were very common devices in the early history of radio communication and detectors. They fell into obscurity with the development of the vacuum tube and again became quite important in later years with the expansion of communications and high frequency in microwave regions. The area type rectifier is most useful for power conversion purposes in which the transfer of massive amounts of A. C. power into comparable D. C. power is desired. When made in large banks such fixed rectifiers are sufficient substitutes for motor generator sets.

In the early days the most common crystal rectifier was galena and as indicated an important component in such early radio receivers was a piece of galena and its attendant cat whisker. More recently, germanium and silicon have emerged as important crystal rectifier materials for the point contact construction. Materials most useful for power conversion purposes are selenium, copper oxide and magnesium sulfide.

Germanium and silicon point contact rectifiers suffer from several disadvantages. Germanium is an expensive material and must be very carefully processed in order to obtain the best results. While the resistance ratios are high and the voltage of operation is correspondingly high the carrying capacity is relatively low. In view of the method of preparation of both silicon and germanium the materials are inherently expensive. In the case of both selenium and copper oxide the most common type of plate or area type rectifying materials the voltage carrying capacity is relatively low or in terms of the electrical engineer the back voltage exceeds 50 to 60 volts.

The general field of crystal rectifiers is an exceptionally important one in electrical engineering and in communications.

It is an object of this invention to develop a group of crystal rectifier materials which are useful both as point contact and area type rectifiers.

It is another object of this invention to develop materials which are relatively inexpensive and which may be processed by simple means to make them useful both as point contact and area type rectifiers.

It is a still further object of this invention to develop crystal rectifiers which under proper operating conditions will stand exceptionally high operating voltages and high operating currents so that when properly used they exhibit advantages over existing fixed rectifying devices.

In accordance with our invention these and other advantages which are incidental to their application can be obtained with reduced titanates of the alkaline earth metals particularly those titanates of barium, strontium, calcium or mixtures of barium, strontium and calcium when these titanates are made effective for rectifying purposes by ceramic procedures and a superimposed barrier layer of lead oxide.

In the accompanying drawings which illustrate preferred forms of devices embodying features of this invention Figure 1 is a perspective view partly in section showing the disc of a reduced titanate of an alkaline earth metal having a conductive coating on one surface and lead oxide film on the other.

When fired in an oxidizing atmosphere through vitrification the titanates are first class insulators having resistivities of the order of thousands of megohm centimeters. It has been found that when these titanates are fired in a strongly reducing atmosphere through vitrification the resistivities are of the order of a few ohm centimeters and the fully reduced material exhibits non-linear characteristics. If a barrier layer is then formed on the surface the system functions as an efficient rectifier.

Figure 1:
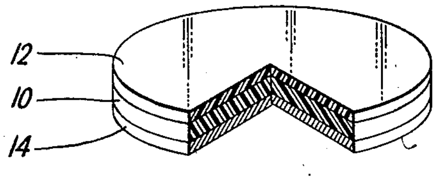

In Figure 1 of the drawings 10 represents a reduced titanate of an alkaline earth metal, 12 represents lead oxide coating on the top surface of the reduced titanate and 14 represents an electrical conducting coating. Additional layer 16 shown in Figure 2 as superimposed on layer 12 represents a counter-electrode material which may preferably be made of a soft metal such as lead or cadmium.

The general method of preparation involves formation of a part or sheet by compression of powder. The formed pellet is then fired in a clean dry reducing atmosphere at temperatures on the order of 2000 to 2600 F. and then permitted to cool in such clean atmosphere. The surface of the pellet is then given a lead oxide coating. This may be accomplished by electrodeposition from a lead nitrate bath.

Figure 2:
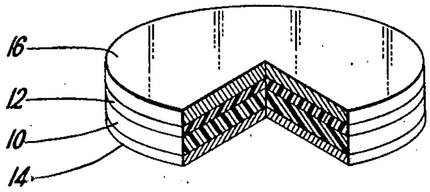
Figure 2 is a perspective view partly in section of an area type rectifier of this invention.
Figure 3:
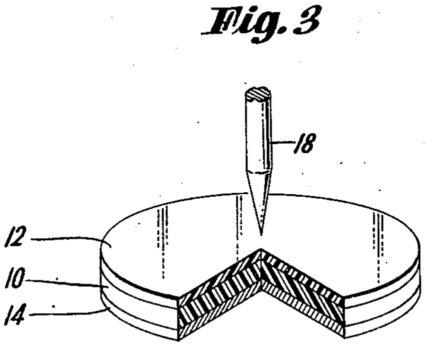
Figure 3 is a perspective view partly in section of a point type rectifier of this invention.

A variety of counter-electrodes are suitable for developing the most useful properties but of these it has been found that relatively soft blunt points are most effective and such points are made of lead or combinations of tin, lead or cadmium. These metals may be in the form of points 18 as shown in Figure 3 in which a considerable pressure is developed at point of contact or as an area covering the entire effective surface of the reduced and lead oxide coated titanate pellet as shown in Figure 2. Such contact electrodes becomes effective under the application of rather heavy pressures.

Specifically the method of preparation of these various rectifying materials is subject to a number of preferred variations which will be described in detail. Titanates of calcium, strontium and barium in their mixtures with one another are available commercially in the form of fully reactive ceramic powders having a particle size in the range of 3 to 10 microns. These are formed into shape from a mixture consisting of 100 parts of any of the powder titanates, ten parts of a 15% solution of polyvinyl alcohol. Other tempering agents such as ethyl cellulose in the form of a 2% solution may conveniently be used in cases where the organic material creates a problem with respect to maintaining reasonably clean furnace atmosphere, water alone is suitable. The advantages of such agents as polyvinyl alcohol and methyl cellulose is to provide sufficient strength so that the clean pieces may be handled without fear of breaking prior to their insertion into the furnace. The pellets are then pressed with pressures of the order of 4000 to 8000 lbs. per square inch. After being dried at room temperature for a period of 24 hours they are placed inside saggers whose interior is lined with a smooth surface of powdered barium zirconate. The function of the barium zirconate is to prevent reaction between the titanate material and the sagger material at the elevated temperatures to which the devices are fired. The pieces are then fired in a hydrogen furnace at temperatures at the order of 2000 to 2600° F. and are maintained at this top temperature for a period of three hours. Clean pure hydrogen is used.

The titanate rectifying materials may also be prepared with the use of doping agents such as lanthanum. Amounts of lanthanum up to 5% have been used successfully for this purpose. It has been found that when the lanthanum doping agent is used it is possible to replace part of the hydrogen in the furnace with helium. This is of some importance in the processing steps since the addition of helium helps to cut down the amount of water vapor which would normally be formed and also helps to reduce the normal hazards of working with a hydrogen furnace. In those cases in which amounts of 3% of lanthanum are used in the doping of the titanate the ratio of helium to hydrogen can be as such as eight to one.

The barrier layer which has been found to be more effective than any other of the previous types of barrier layers which had been obtained by oxidizing the surface of the titanate can then be applied. The layer which has been found to be most effective to date is one which consists of a relatively thin coating of lead oxide. This oxide coating can naturally be applied in several ways. The one which has been found to be most easily applicable is one in which the oxide coating is applied electrolytically. This coating is applied from an electrolytic solution which can be made by mixing together 300 grams of lead nitrate, 1000 cc. of water and 5 cc. of concentrated nitric acid. When this solution is used for the electrodepositing of the lead oxide on the titanate surface the electrolysis is carried for three minutes at 20 ma. current per square centimeter. The deposit formed is a reddish brown to brownish black deposit and is about .005″ thick. The titanate is then removed from the electrolytic bath, thoroughly washed in running water and allowed to dry.

When this material is used as a rectifier the contact can be made through the barrier layer by means of a dull point of soft material such as lead or tin when the rectifier is to be used as a point contact rectifier or the counter-electrode may be formed on top of the barrier surface through a plate of solder, cadmium or similar metal.

Under proper conditions breakdown voltages as high as 65–70 volts can be obtained before breakdown while forward currents of the order of 300–400 ma. can be obtained at 2–4 volts. At resistances of about 2 ohms the efficiency of this rectifier has been found to be approximately 750%.

*Example*

To 100 parts of a mixture containing 35.38% $TiO_2$ and 64.2% of $SrCO_3$ is added 2.34 parts of $LaNO_3$ and 100 parts of water. This mixture is then ball milled. To the ball milled mixture is added 1.6 parts by weight of ammonium carbonate plus 40 parts of water which is then further ball milled, dried and pulverized. The pulverized material is to be fired at 1050° C. for four hours after which it is again pulverized whereupon 3% of magnesium stearate and 1% polyvinyl alcohol is added to 100 parts of the product after which 140 parts of water is added and the entire mixture is again ball milled, dried and pulverized after which the product is pressed into the desired shapes at pressures in the order of 8000 lbs. per square inch and fired at temperatures ranging from 2000 to 2700° F. This material is fired in an eight to one volume ratio of helium to hydrogen in the furnace. One surface of the material so obtained is coated with the lead oxide coating by electrolytically depositing the lead oxide thereon from a lead nitrate bath prepared by mixing 300 grams of lead nitrate, 1000 cc. of water and 55 cc. of concentrated nitric acid. The current used during the deposition is 20 ma. per square centimeter, for a period of three minutes. The coating so obtained will have a thickness of approximately .005″. The coated product so obtained can readily be used as a rectifier material by the use of either a point contact or barrier type counter-electrode in contact with the lead oxide coating.

While the above description and drawings submitted herewith disclose a preferred and practical embodiment of the lead oxide coated titanate rectifier of this invention it will be understood that the specific details of construction and arrangement of parts as shown and described are by way of illustration and are not to be construed as limiting the scope of the invention.

What is claimed is:

1. A current rectifier comprising an electrode of a partially reduced titanate of an alkaline earth metal having a lead oxide surface.

2. A current rectifier comprising an electrode of a partially reduced titanate of barium having a lead oxide surface.

3. A current rectifier comprising an electrode of a partially reduced titanate of calcium having a lead oxide surface.

4. A current rectifier comprising an electrode of a partially reduced titanate of strontium having a lead oxide surface.

5. A current rectifier comprising an electrode of a partially reduced titanate of a mixture of alkaline earth metals having a lead oxide surface.

6. A current rectifier comprising an electrode of a partially reduced titanate of an alkaline earth metal having a lead oxide surface and a counter-electrode of a soft metal in contact with the lead oxide surface of said electrode.

7. A point contact rectifier comprising an electrode of a partially reduced titanate of an alkaline earth metal having a lead oxide surface and a pointed counter-electrode of a soft metal in contact with the oxide surface of said electrode.

8. An area contact rectifier comprising an electrode of a partially reduced titanate of an alkaline earth metal having a lead oxide surface and a counter-electrode of a soft metal in contact with the lead oxide surface of said electrode.

9. In the method of producing a rectifier the steps comprising compressing a powdered titanate of an alkaline earth metal to form pellets, placing said pellets into saggers lined with barium zirconate and separated from one another by titanium hydride, firing the compressed pellets in dry hydrogen to render said pellets semiconductive, and subsequently forming a barrier layer by forming a layer of lead oxide thereon.

10. In the method of producing a rectifier the steps comprising compressing a powdered titanate of an alkaline earth metal to form pellets, placing said pellets into saggers lined with barium zirconate, firing said pellets in dry hydrogen at a temperature lying within the range of 2000°–2600° F., to render said pellets semiconductive, cooling said pellets in dry hydrogen, polishing one of its surfaces and subsequently forming a barrier layer thereon by electrolytically depositing lead oxide thereon.

11. A semiconducting device including semiconductive titanate of an alkaline earth metal having a lead oxide surface.

12. A rectifier comprising a body of partially reduced alkaline earth metal titanate selected from the group consisting of barium, strontium, and calcium and mixtures thereof, a relatively thin layer of lead oxide on one surface of said body, and a counter-electrode in contact with said relatively thin layer of lead oxide.

13. A rectifier comprising a body of partially reduced alkaline earth metal titanate of barium, a relatively thin layer of lead oxide on one surface of said body, and a counter-electrode in contact with said relatively thin layer of lead oxide.

14. A rectifier comprising a body of partially reduced alkaline earth metal titanate of strontium, a relatively thin layer of lead oxide on one surface of said body, and a counter-electrode in contact with said relatively thin layer of lead oxide.

15. A rectifier comprising a body of partially reduced alkaline earth metal titanate of calcium, a relatively thin layer of lead oxide on one surface of said body, and a counter-electrode in contact with said relatively thin layer of lead oxide.

16. A point contact rectifier comprising an electrode of partially reduced alkaline earth metal titanate selected from the group consisting of barium, strontium, and calcium and mixtures thereof, a relatively thin surface layer of lead oxide on said body, and a pointed counter-electrode in contact with said relatively thin layer of lead oxide.

17. A point contact rectifier comprising an electrode of partially reduced alkaline earth metal titanate of barium, a relatively thin surface layer of lead oxide on said body, and a pointed counter-electrode in contact with said relatively thin layer of lead oxide.

18. A point contact rectifier comprising an electrode of partially reduced alkaline earth metal titanate of strontium, a relatively thin surface layer of lead oxide on said body, and a pointed counter-electrode in contact with said relatively thin layer of lead oxide.

19. A point contact rectifier comprising an electrode of partially reduced alkaline earth metal titanate of calcium, a relatively thin surface layer of lead oxide on said body, and a pointed counter-electrode in contact with said relatively thin layer of lead oxide.

References Cited in the file of this patent

UNITED STATES PATENTS

| | | |
|---|---|---|
| 1,924,300 | Atherton | Aug. 29, 1933 |
| 1,932,067 | Duhme | Oct. 24, 1933 |
| 2,695,380 | Mayer et al. | Nov. 23, 1954 |
| 2,711,496 | Ruben | June 21, 1955 |

OTHER REFERENCES

Hackh's Chemical Dictionary, second edition (1937), page 534.

Henisch: Electronic Engineering, October 1946, pp. 313–315.

Hausner: Journal of the American Ceramic Society, vol. 30 (1947), pp. 290–296.